(12) United States Patent
Moriat

(10) Patent No.: US 6,965,068 B2
(45) Date of Patent: Nov. 15, 2005

(54) SYSTEM AND METHOD FOR ESTIMATING TONES IN AN INPUT SIGNAL

(75) Inventor: Alain Moriat, Copenhagen N (DK)

(73) Assignee: National Instruments Corporation, Austin, TX (US)

( * ) Notice: Subject to any disclaimer, the term of this patent is extended or adjusted under 35 U.S.C. 154(b) by 1151 days.

(21) Appl. No.: 09/753,164

(22) Filed: Dec. 27, 2000

(65) Prior Publication Data

US 2002/0120354 A1 Aug. 29, 2002

(51) Int. Cl.[7] .............................. G10H 7/00; G06F 17/00
(52) U.S. Cl. ........................................... 84/616; 700/94
(58) Field of Search .......................... 324/76.47, 76.39, 324/76.55; 708/309, 311; 702/76; 381/101, 102, 97; 704/205; 700/94; 333/28 T; 455/267; 84/622, 659, 692, 616

(56) References Cited

U.S. PATENT DOCUMENTS

| | | | |
|---|---|---|---|
| 4,698,769 A | | 10/1987 | McPherson et al. |
| 4,841,827 A | * | 6/1989 | Uchiyama .................... 84/622 |
| 5,018,428 A | * | 5/1991 | Uchiyama et al. ............ 84/616 |
| 5,165,051 A | * | 11/1992 | Kumar ..................... 324/76.47 |
| 5,412,152 A | * | 5/1995 | Kageyama et al. ........... 84/607 |
| 5,436,403 A | * | 7/1995 | Usa ............................. 84/609 |
| 5,808,225 A | * | 9/1998 | Corwin et al. ................ 84/622 |
| 6,122,657 A | | 9/2000 | Hoffman, Jr. et al. |
| 6,128,370 A | | 10/2000 | Barazesh et al. |
| 6,195,675 B1 | | 2/2001 | Wang et al. |
| 6,229,889 B1 | | 5/2001 | Cannon et al. |
| 6,473,732 B1 | * | 10/2002 | Chen ......................... 704/205 |
| 6,665,622 B1 | * | 12/2003 | Chappell et al. ............... 702/76 |
| 6,718,217 B1 | * | 4/2004 | Shinohara et al. ............ 700/94 |

* cited by examiner

Primary Examiner—Sinh Tran
Assistant Examiner—Andrew Flanders
(74) Attorney, Agent, or Firm—Meyertons Hood Kivlin Kowert & Goetzel. P.C.; Jeffrey C. Hood; Mark K. Brightwell

(57) ABSTRACT

A system and method for analyzing an input signal comprising one or more sinusoidal tones. A processor of the system receives samples of an input signal and operates on the samples to generate a transform array. The processor identifies positive frequency peaks of the transform array, and estimates a set of signal parameters (e.g. tone frequency and complex amplitude) for each of the positive frequency peaks. Each tone is represented in the transform array as a positive frequency image and a corresponding negative frequency image. Using the parameter sets, the processor may estimate the amount of cross-interaction between the images, i.e., may compute the amounts by which each positive frequency peak is effected by the negative frequency images and other positive frequency images. These amounts may be subtracted from each positive frequency peak to generate improved peak values. The processor may use the improved peak values to compute improved estimates for the signal parameters. The operations of (a) estimating the cross-interaction amounts based on current parameter estimates for the multiple tones, (b) subtracting the cross-interaction amounts from the current peak values to generate improved peak values for each tone, and (c) computing improved parameter estimates for the multiple tones from the improved peak values may be repeated a predefined number of time or until a termination criteria is achieved.

44 Claims, 11 Drawing Sheets $|S(k)| = |Y(k) - D(k)|$

SYSTEM AND METHOD FOR ESTIMATING TONES IN AN INPUT SIGNAL

FIELD OF THE INVENTION

The invention relates generally to the field of signal analysis, and more particularly, to a system and method for detecting the frequency, amplitude and/or phase of one or more tones comprised within an input signal.

DESCRIPTION OF THE RELATED ART

The discrete Fourier transform (DFT) is a popular tool for analyzing signals. However, before an input signal is transformed, it is quite often windowed with a windowing function. (It is noted that the action of capturing of a finite-length sequence of samples of the input signal automatically implies a rectangular windowing.) The transform Y of the windowed input signal will typically exhibit multiple scaled and shifted versions of transform function W, i.e., the transform of the window function. Each sinusoidal component of the input signal expresses itself as a pair of such shifted versions, one version shifted up to the frequency $f_j$ of the sinusoidal component, and the other shifted down to frequency $-f_j$. The positive frequency version is referred to herein as a positive frequency image, and the negative frequency version is referred to herein as a negative frequency image. When a sinusoidal component frequency $f_j$ is small compared to the sample rate, the positive frequency image and the negative frequency image for the sinusoidal component may overlap in frequency space. Similarly, when a sinusoidal component frequency $f_j$ is close to one-half the sample rate, the positive frequency image and the negative frequency image for the sinusoidal component may overlap. Furthermore, when two sinusoidal components have frequencies that are close together, their positive images and negative images may overlap.

Prior art techniques for tone estimation quite often focus on identifying the peaks in the magnitude spectrum |Y|. The peaks roughly determine the frequency of the corresponding tones. However, because of the cross-interaction of the images from other tones, or the negative frequency image from the same tone, the peak of a positive frequency image may be perturbed away from a purely scaled and frequency-shifted version of the template function W. Thus, parameter estimation techniques which compute parameters for a given tone based only on transform array values (i.e. DFT values) in the vicinity of a corresponding image peak may not produce accurate results. Therefore, there exists a substantial need for a system and method which could estimate tone parameters from the transform array with increased accuracy.

SUMMARY OF THE INVENTION

The present invention comprises various embodiments of a system and a method for estimating signal parameters (e.g. frequency, amplitude and/or phase) of one or more sinusoidal tones present in an input signal. More particularly, one embodiment of the invention comprises a system and method for estimating parameters for a single tone based on a transform Y of the input signal. The input signal may be windowed with a window function w(n) and transformed into the frequency domain. The tone in the input signal expresses itself in the frequency domain as an additive combination of two spectra, one centered at the tone frequency and the other at the negative of the tone frequency. These two spectra are referred to herein as the positive frequency image and the negative frequency image respectively. The continuous-frequency transform W of the window function and the positive and negative frequency images have identically-shaped magnitude envelopes. Thus, a peak in the magnitude spectrum of the transform Y gives an initial estimate for the frequency and amplitude of the tone. Furthermore, the phase angle of the transform values in the neighborhood of the peak gives an estimate for the phase of the tone. The initial frequency, amplitude and phase estimates may be used to compensate for the effect of a negative frequency image on the transform array in the frequency domain, especially in the neighborhood of the peak frequency. In other words, estimate values of the negative frequency image may be subtracted from the complex coefficients of the transform array in the neighborhood of the peak frequency. The resulting difference values may be used to compute improved estimates for the tone frequency, amplitude and phase.

In one embodiment, a system may be configured to estimate signal parameters for one or more tones present in an input signal. The system may comprise an input for receiving an input signal, a memory, a processor and an output device, such as a display. The memory may store a software program which is executable by the processor. In response to execution of the software program, the processor is operable to perform the following operations.

(1) The processor may operate on samples of the input signal to generate a transform array. The transform array may include a positive frequency image and negative frequency image for each of the tones. The negative frequency images of the tones may distort or disturb observations of the positive frequency images of the tones of interest. Furthermore, one or more of the positive frequency images of the tones may also possibly disturb observations of the positive frequency images of the tones of interest.

(2) The processor may identify locations of one or more magnitude peaks in the transform array. These frequency locations roughly locate the positive frequency images (and thus, the tone frequencies).

(3) The processor may compute an initial frequency estimate, amplitude estimate and phase estimate for each of the one or more tones based on the transform array values in the neighborhood of a corresponding one of the peak frequency locations. These transform array values are complex numbers. The initial frequency estimate and amplitude estimate for each tone are determined based on the magnitudes of the transform array values. The initial phase estimate for each tone is determined based on at least one of the phase angles of the transform array values. These initial parameter estimates may incorporate errors since the positive frequency image of each tone is additively mixed with the other positive and negative frequency images.

(4) The processor may correct the transform array values in the neighborhood of each peak frequency location by subtracting the effect of any interacting positive and/or negative frequency images due to other tones or the self-interaction due to the negative frequency image of the same tone. The positive and negative frequency images of the interacting (i.e. aliasing) tones are approximated using the initial frequency, amplitude and phase estimates computed in (3) above. The difference values resulting from the transform corrections comprise a better approximation to the positive frequency image for each tone.

(5) The processor may compute an improved frequency estimate, amplitude estimate and phase estimate for each of the one or more tones based on the difference values, i.e. the corrected transform values, in the neighborhood of the corresponding peak frequency location. The improved frequency estimate and improved amplitude estimate for each tone are determined based on the magnitudes of the difference values in the neighborhood of the corresponding peak frequency location. The initial phase estimate for each tone is determined based on at least one of the phase angles of the difference values in the neighborhood of the corresponding peak frequency location. These initial parameter estimates may be more accurate than the initial estimate the effect of aliasing images on the image of interest have been compensate by the subtraction of step (4) above.

The processor may transmit an indication of the improved set of signal parameters to the output device. For example, the improved set signal parameters may be displayed on a display device. Alternatively, the improved set of signal parameters may be forwarded to another system/device (or another software routine running on the same processor) for further processing.

In step (1) above, the processor may window the input signal, and compute a discrete Fourier transform of the windowed input signal. The discrete Fourier transform may be implemented by a fast algorithm such as the FFT.

The input signal may comprise one or more sinusoidal tones $x_1, x_2, \ldots, x_L$ occurring at frequencies $f_1, f_2, \ldots, f_L$ respectively. Each tone $x_i$ expresses itself in the transform array as an additive combination of a positive frequency image of the form $$(A_i/2)\exp(j\theta_i)W(f-f_i)$$

and a negative frequency image of the form $$(A_i/2)\exp(-j\theta_i)W(f+f_i),$$

where variable f denotes frequency, and W(f) is a continuous-frequency expression for the transform of the window function w(n). Thus, the transform array comprises an additive combination of positive frequency images and negative frequency images corresponding to the one or more tones. Because the positive and negative frequency images may overlap with each other (especially when the tone frequencies are near zero, near one-half the sample rate, or near to each other), the frequency locations of magnitude peaks in the transform array may provide only a rough approximation to the tone frequencies $f_i$. In other words, the observability of a given image may be adversely affected by the other positive and negative frequency images which overlap with the given image.

The processor may identify the frequency locations of one or more magnitude peaks in the magnitude spectrum $|Y(k)|$ of the transform array. In particular, the processor may search for magnitude peaks which exceed a magnitude threshold in a positive-frequency region of the transform array. A bin index value $k_{max}$ may be determined for each of the threshold-exceeding magnitude peaks. The bin index value $k_{max}$ for each magnitude peak defines the bin index at which the corresponding magnitude peak is maximized. It is noted that the index k of the transform array is referred to herein as the bin index.

The processor may compute a frequency estimate, an amplitude estimate and a phase estimate for each of the one or more tones based on a corresponding one of the magnitude peaks. The frequency estimate and amplitude estimate for a given tone are determined from the magnitude values of the corresponding magnitude peak under the assumption that the magnitude peak is a shifted and scaled version of the window transform magnitude $|W|$. The center frequency of the magnitude peak determines the frequency estimate, and the size of the magnitude peak relative the window magnitude $|W|$ determines amplitude estimate. The phase estimate for a given tone is determined based on one or more the phase angles of the transform array coefficient (which are complex numbers) in the neighborhood of the corresponding magnitude peak.

The frequency, amplitude and phase estimates for the one or more tones are used to estimate the positive and negative frequency images, and to subtract out the cross-interaction between images. More particularly, the processor may correct the transform array parameters to correct the transform array values in the neighborhood of each peak frequency location. For a given tone, the processor may correct the transform array values around the corresponding peak frequency location by subtracting estimated values of any aliasing images. Aliasing images may include the positive and negative frequency images of tones other than the given tone, and the negative frequency image of the given tone.

After correcting the transform array values, the processor may recomputed the tone frequencies, amplitudes and phases based on the corrected transform array values. Because the corrected transform array values more closely approximate the positive frequency images that the original transform array values, the recomputed parameter estimates may be more accurate.

In one embodiment, the steps of correcting the transform array values and recomputing the parameter estimate may be performed repeatedly. When a termination criteria is achieved, the repetition may be terminated and final estimates for the signal parameters (e.g. tone frequencies, amplitudes and phases) may be transmitted to an output device (e.g. display screen).

In one embodiment, the tone frequencies, amplitudes and/or phases may be used to decode analog and/or digital signal information contained within the signal. For example, the method may be used to more accurately identify the tones present in the input signal. Thus, the final estimates for tone frequencies, amplitudes and/or phases may be used to recover encoded analog and/or digital signals.

BRIEF DESCRIPTION OF THE DRAWINGS

A better understanding of the present invention can be obtained when the following detailed description of the preferred embodiment is considered in conjunction with the following drawings, in which.

Figure 1A:
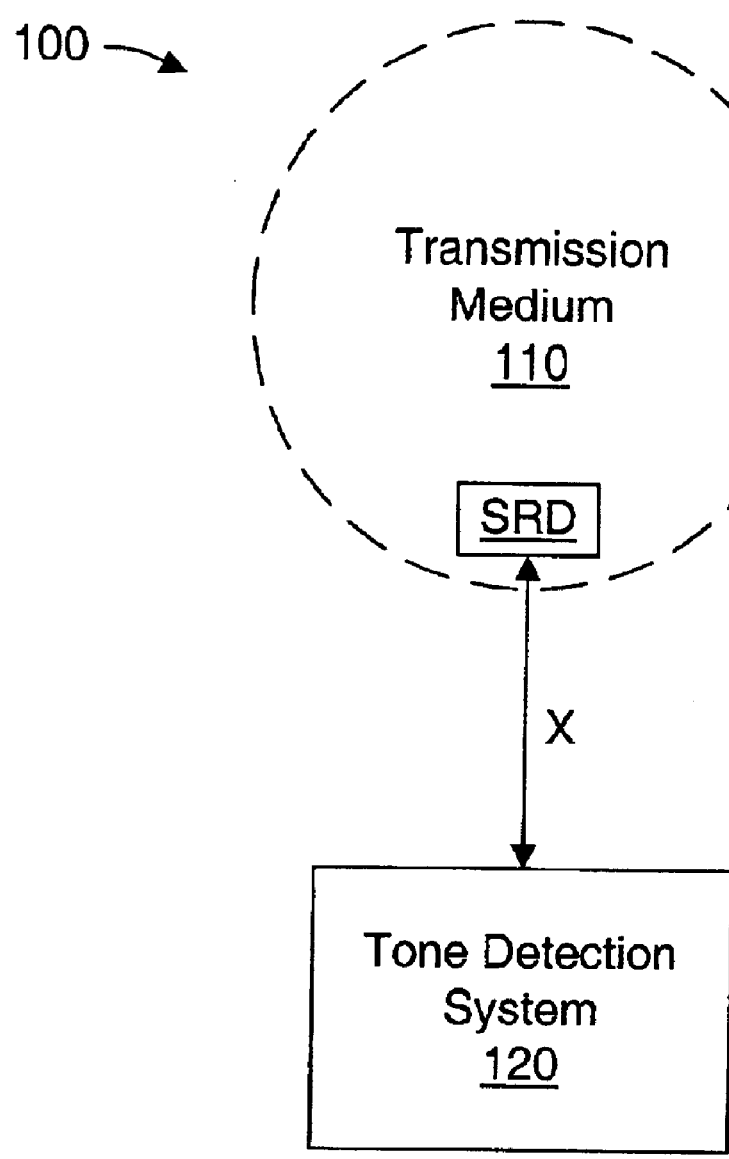
FIG. 1A illustrates a system configuration 100 for determining the signal parameters associated with one or more sinusoidal tones comprised within an input signal.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1A

FIG. 1A illustrates a system configuration 100 for performing signal processing on a signal comprising one or more tones. System configuration 100 may comprise a signal reception device SRD and a tone detection system 120. The SRD may coupled to receive a signal from a device, unit under test (UUT) or a transmission medium 110, or any other system capable of transmitting a signal that may contain tones. The term "transmission medium" is used herein to refer generally to a device, unit under test (UUT) or a transmission medium 110 that may generate a signal including one or more tones. As used herein, the term "tone" includes a signal at a frequency, e.g., at a primary or single frequency, which may be contained within another signal.

As shown in FIG. 1A, SRD may be coupled to a transmission medium 110. Transmission medium 110 may represent any of a variety of transmission media such as the atmosphere, free space, an optical fiber or fiber bundle, a communication bus (e.g. a network bus), a body of water or any other fluid, the earth, etc. In one embodiment, transmission medium 110 is the atmosphere, and signal reception device SRD comprises an antenna and a radio receiver. In a second embodiment, transmission medium 110 is a network bus connecting two or more computers, and signal reception device SRD is a network interface card/board. In a third embodiment, transmission medium 110 is an optical fiber, and signal reception device SRD comprises an optical sensor. As noted above, element 110 may be any of various devices or mediums for generating or transmitting a signal.

Signal reception device SRD receives an input signal from the transmission medium or device 110 and converts the input signal into a form suitable for presentation to tone detection system 120. The input signal may be electrical or non-electrical in nature. Signal reception device SRD may include analog-to-digital conversion hardware to digitize the input signal. Alternatively, analog-to-digital conversion hardware may be comprised within tone detection system 120.

In one embodiment, signal reception device SRD may comprise a measurement device such as a microphone, an accelerometer, a spatial displacement sensor, a strain gauge, a pressure sensor, a temperature sensor (e.g., a thermocouple), a radiation sensor, an optical sensor, etc, or any combination thereof. In another embodiment, signal reception device SRD may represent an array of transducers or measurement devices of one or more types. SRD may thus be any of various transducers or sensors for receiving a signal.

Figure 1B:
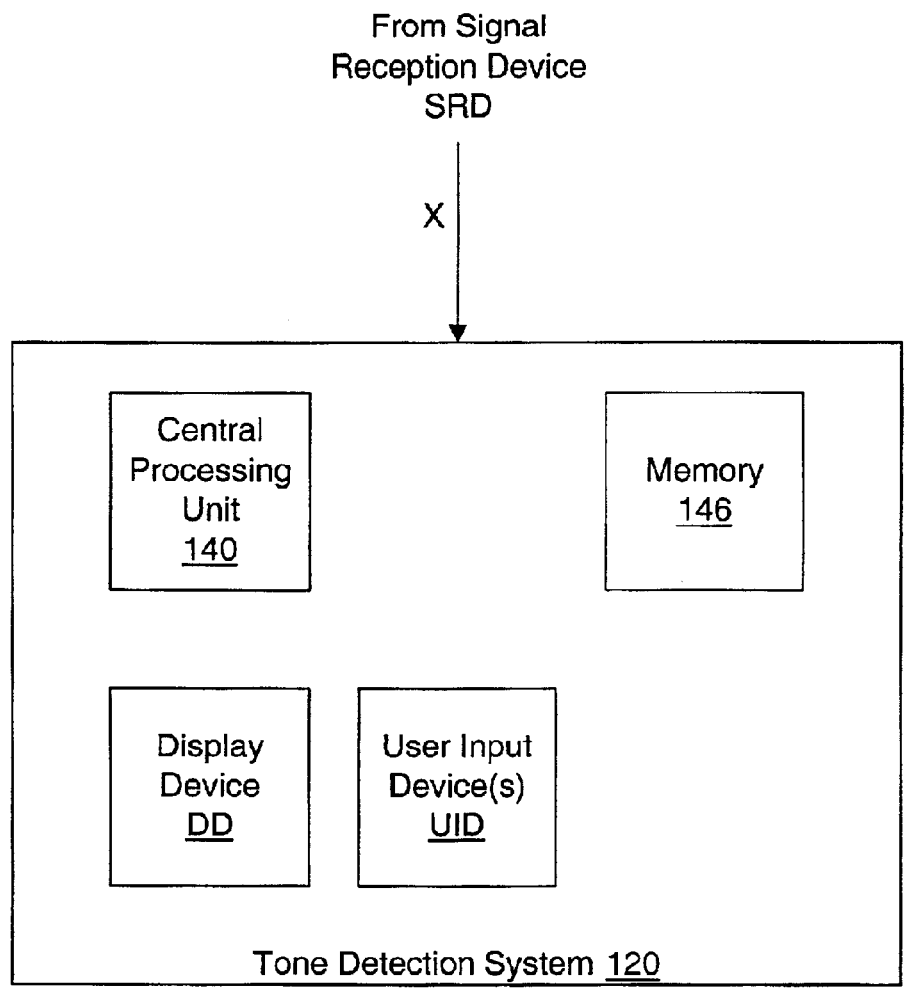
FIG. 1B illustrates one embodiment for tone detection system 120.

Tone detection system 120 may couple to signal reception device SRD. Tone detection system 120 may be configured for detecting the frequency, amplitude and/or phase of one or more tones in the input signal. Tone detection system 120 may comprise a processor or central processing unit 140, memory 146, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory 146 may comprise any of a variety of memory devices such as random access memory (RAM) and/or read-only memory (ROM), as described further below. Tone detection system 120 may also include specialized data acquisition and/or signal conditioning hardware, interface hardware, etc., or any combination thereof.

Tone detection system 120 may comprise any of various devices, such as a programmable computer system, a computer-based system such as a VXI-based system, a PXI-based system, a GPIB-based system, a computer-based data acquisition system, or a dedicated test instrument, such as a dynamic signal analyzer, an oscilloscope or any other signal acquisition and/or analysis device.

Tone detection system 120 may operate on samples of the input signal X generated by signal reception device SRD, and thus, may identify the frequency, phase and/or amplitude of one or more tones in the input signal. The frequency, phase and/or amplitude of the one or more tones may be presented to a user through the display device DD or some other output device, and/or may be stored to memory for future use.

User input device(s) UID may comprise a keyboard, a pointing device such as a mouse or trackball, a touch pad (such as those used in modem laptop computers for cursor control), a touch sensitive display screen, etc., or other input devices. In one embodiment, user input device(s) UID may include use of a graphical control panel configured with various control icons such as buttons, knobs, sliders, switches, indicators, etc., or any combination thereof. A user provides input to tone detection system 120 through user input device(s). Tone detection system 120 may manage a graphical user interface through display device DD and user input device(s) UID.

Figure 2A:
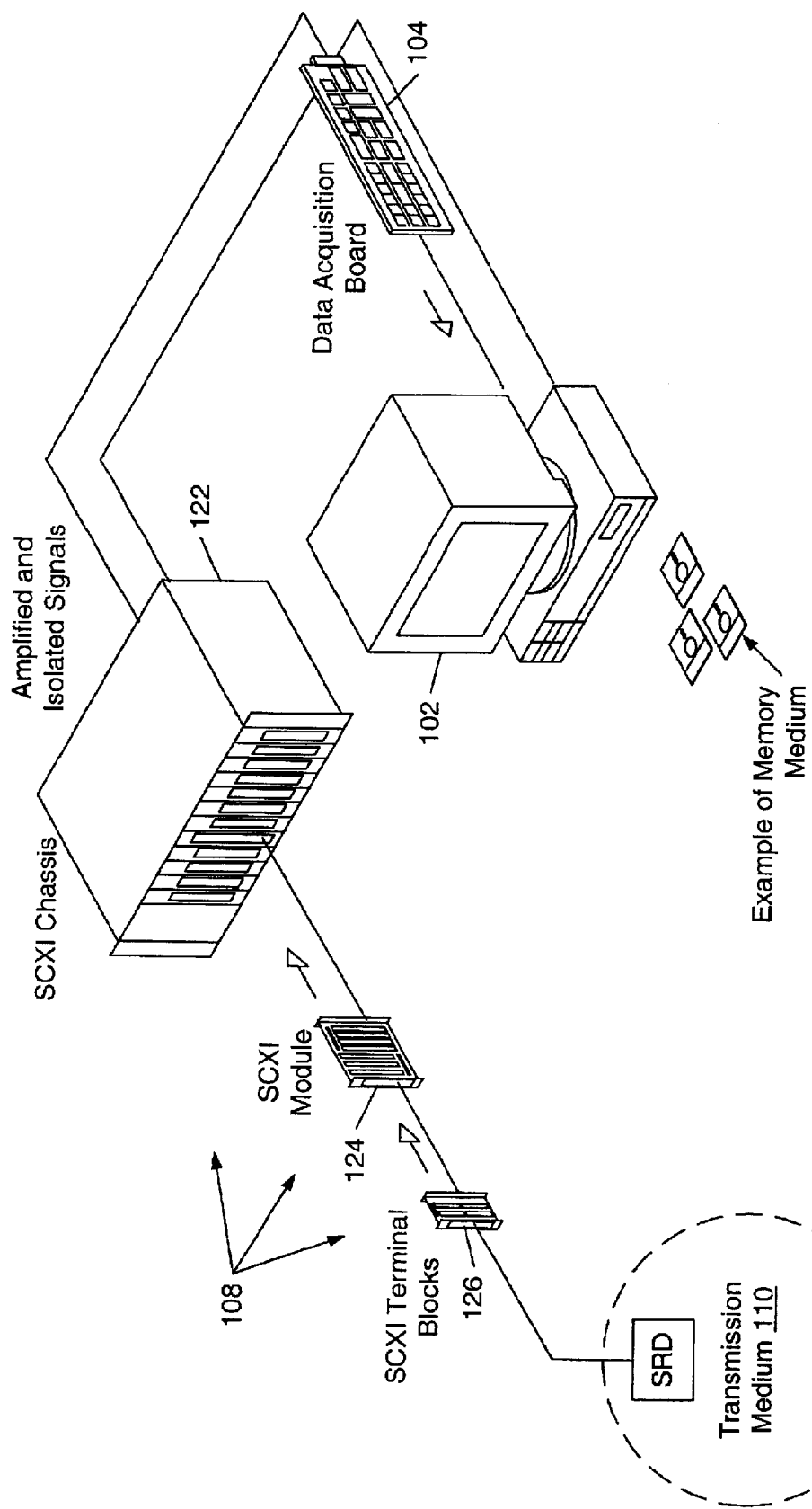
FIG. 2A illustrates one embodiment of tone detection system 120 comprising a computer-based measurement system, where signals generated by signal reception device SRD are presented to computer 102 through signal conditioning system 108 and data acquisition (DAQ) device 104.
Figure 2B:
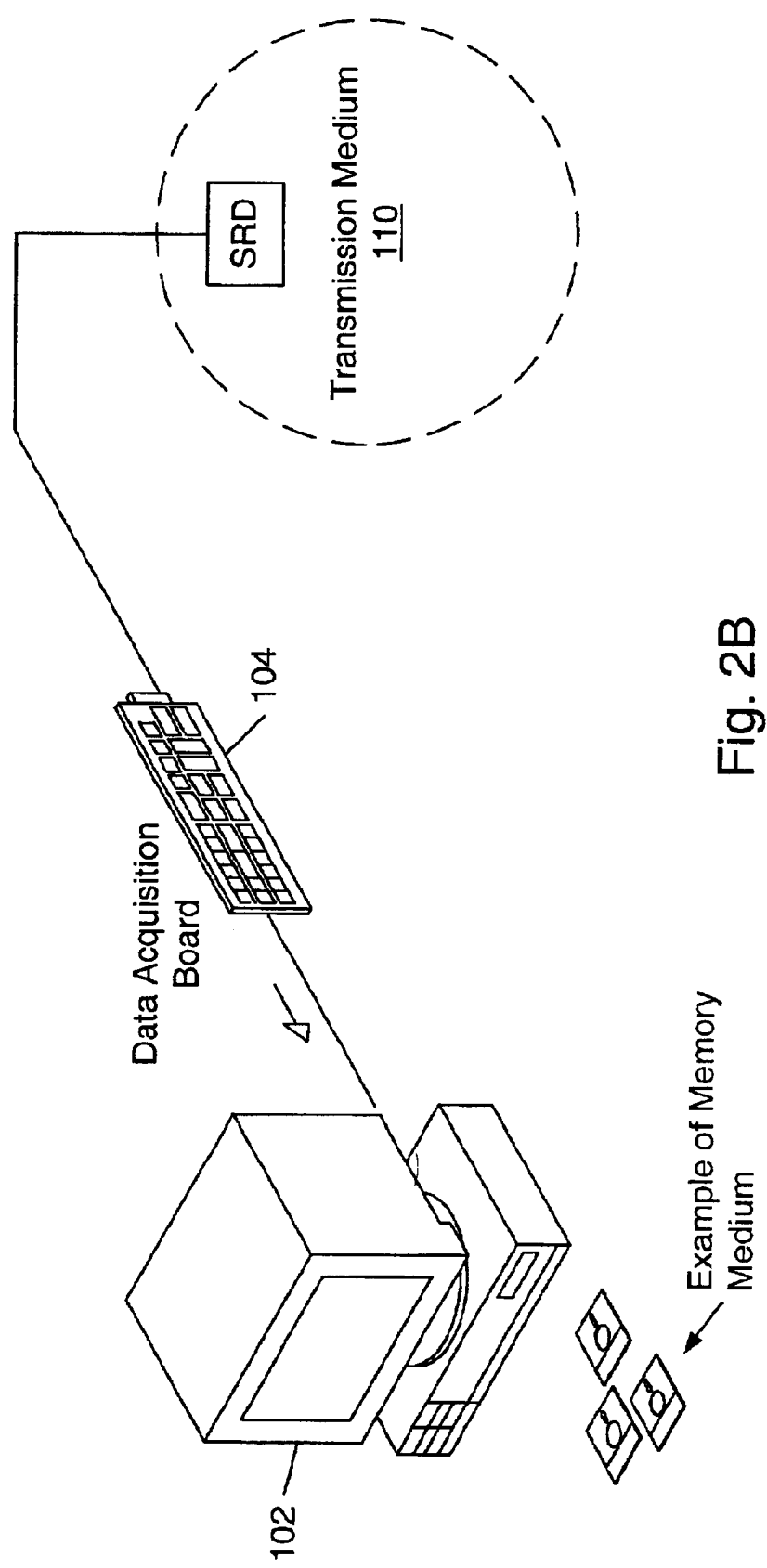
FIG. 2B illustrates a second embodiment of tone detection system 120 comprising a computer-based measurement system, where signals generated by signal reception device SRD are presented to computer system 102 through data acquisition (DAQ) device 104.

FIGS. 2A and 2B

FIG. 2A and 2B illustrate exemplary embodiments of tone detection system 120. As shown, tone detection system 120 may comprise a computer 102, a data acquisition (DAQ) device 104 coupled to the computer 102, and optionally a signal conditioning system 108 coupled to the DAQ device 104. Signal reception device SRD may comprise transducers, sensors, and/or receiving devices that couple to DAQ device 104 through the signal conditioning circuitry 108.

As shown, signal reception device SRD is configured and/or coupled to acquire signals from the transmission medium 110. The input signals acquired by signal reception device SRD may be optionally conditioned by the signal conditioning system 108 as shown in FIG. 2A. The conditioned input signals may then be provided to DAQ device 104 as shown. Signal conditioning system 108 may connect to DAQ device 104 via one or more cables.

Signal conditioning system 108 may comprise an external chassis 122 housing one or more signal conditioning modules 124 and optionally terminal blocks 126. Signal conditioning system 108 may be used to perform signal conditioning on field signals such as the signals generated by signal reception device SRD. As used herein, the term "signal conditioning" may include one or more of amplifying, linearizing, limiting, isolating, filtering, switching and/or multiplexing field signals (e.g. transducer excitation), among other signal processing functions. Signal conditioning system 108 may advantageously reduce the level of noise in the signals transmitted to DAQ device 104. DAQ device 104 may receive conditioned signals from signal conditioning system 108 as shown in FIG. 2A. Alternatively, DAQ device 104 may directly receive the input signal from signal reception device SRD as shown in FIG. 2B. DAQ device 104 may operate to perform analog to digital (A/D) conversion and provides the resultant digital signals to computer 102 for processing.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (A/D) conversion circuitry and/or digital to analog (D/A) conversion circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Tone detection system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks 104, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program according to one embodiment of the present invention for detecting one or more tones in the input signal. More particularly, the software program may be operable to analyze the input signal to determine the frequency, phase and amplitude of one or more tones in the input signal.

The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A processor, such as the host CPU, executing code and data from the memory medium, or a programmable device configured according to a net list, may comprise embodiments of a means for determining the frequency, phase and amplitude of the one or more tones embedded in the input signal according to the methods described below.

Various embodiments further include receiving, storing, and/or transmitting instructions and/or data implemented according to the present invention upon a carrier medium. Suitable carrier media include a memory medium as described above, as well as signals such as electrical, electromagnetic, or digital signals, conveyed via a communication medium such as networks and/or a wireless link.

Figure 3A:
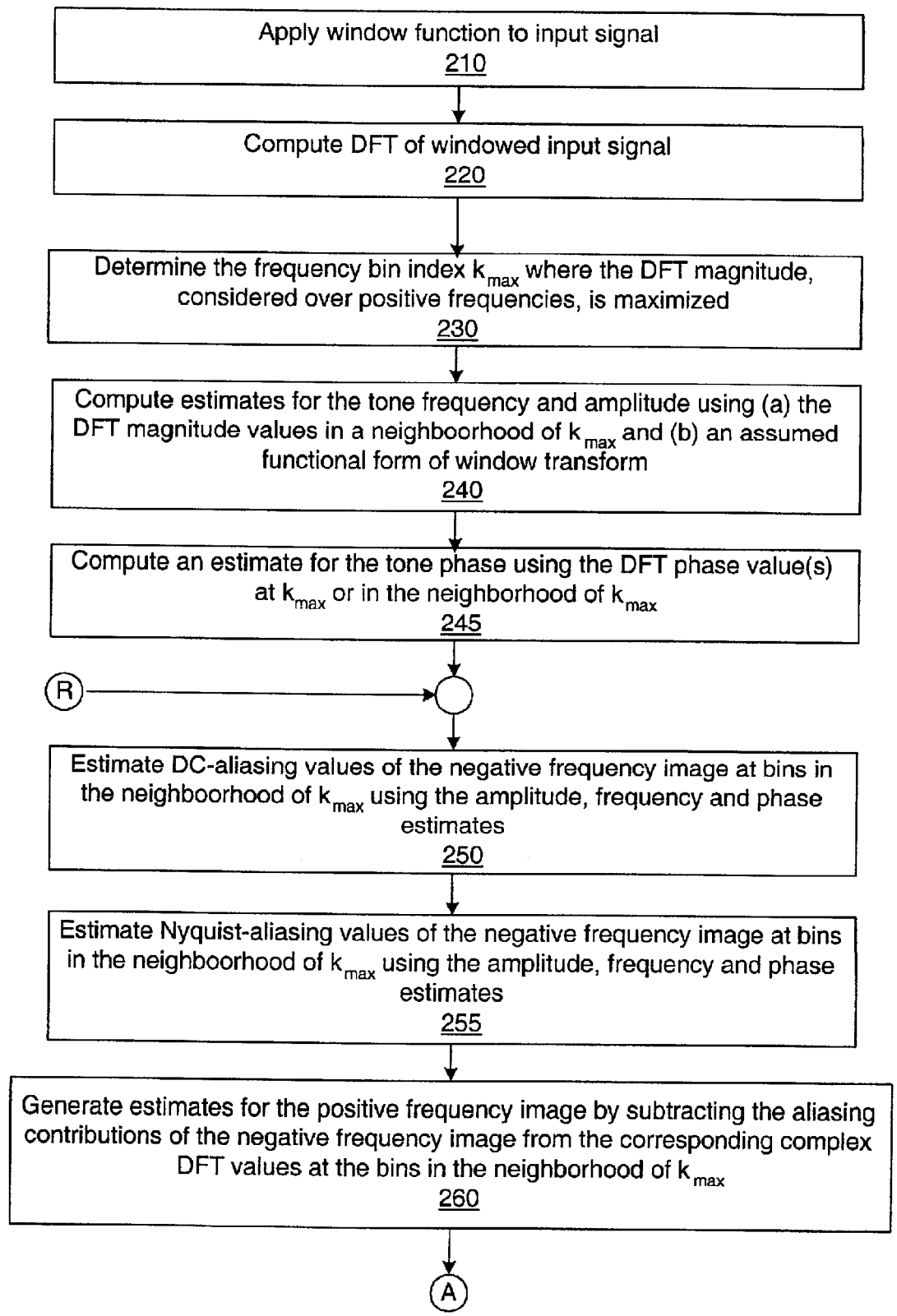
FIGS. 3A–B presents a flowchart for one embodiment of a tone detection system according to the present invention.
Figure 3B:
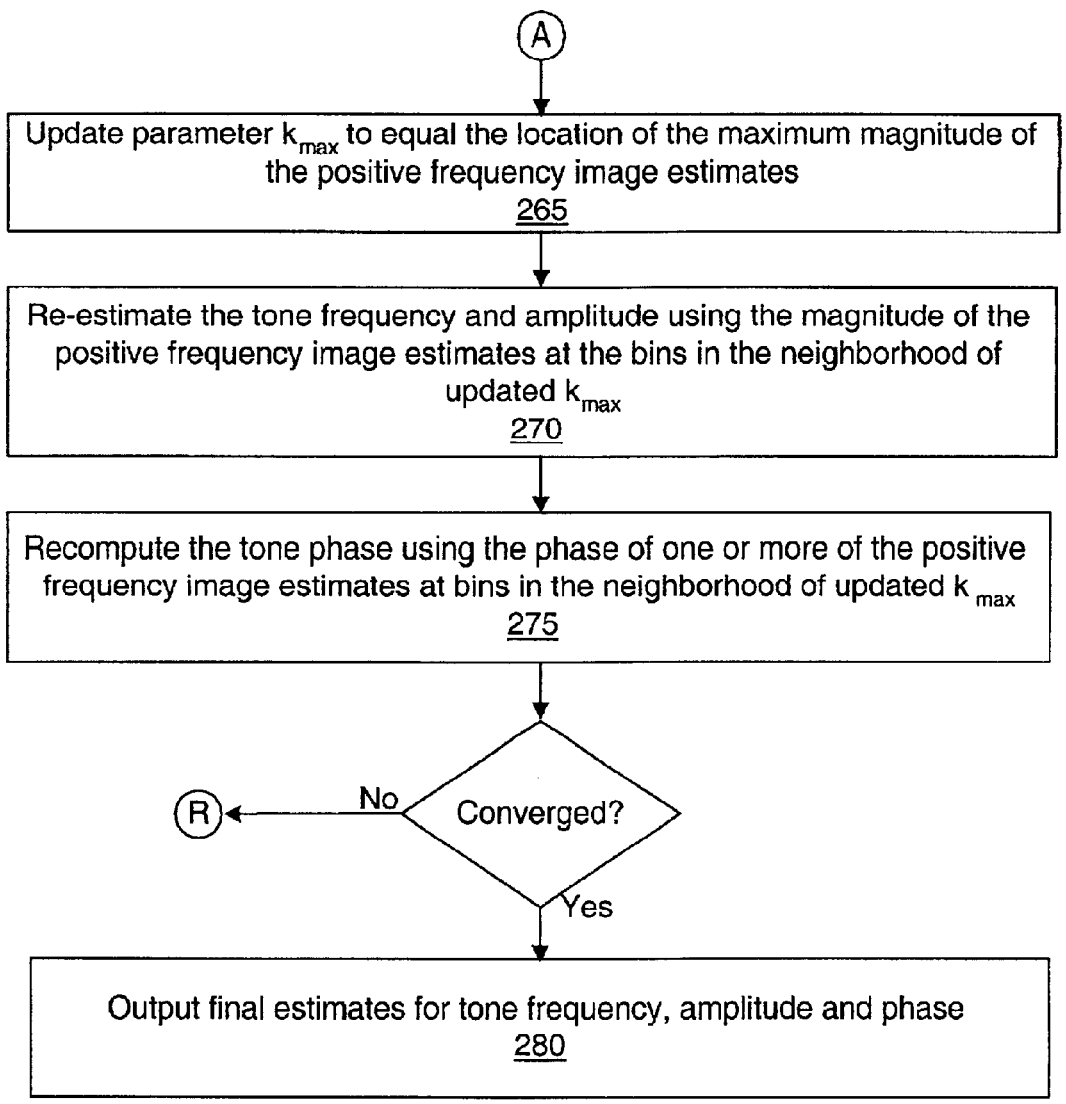

FIGS. 3A&B—Aliasing Compensation Flowchart

FIGS. 3A&B illustrate one embodiment of an aliasing compensation method for determining the frequency, amplitude and/or phase of a single tone present in the input signal. The method of FIGS. 3A&B may be implemented by execution of a computer program stored on the memory medium as described above.

Figure 4:
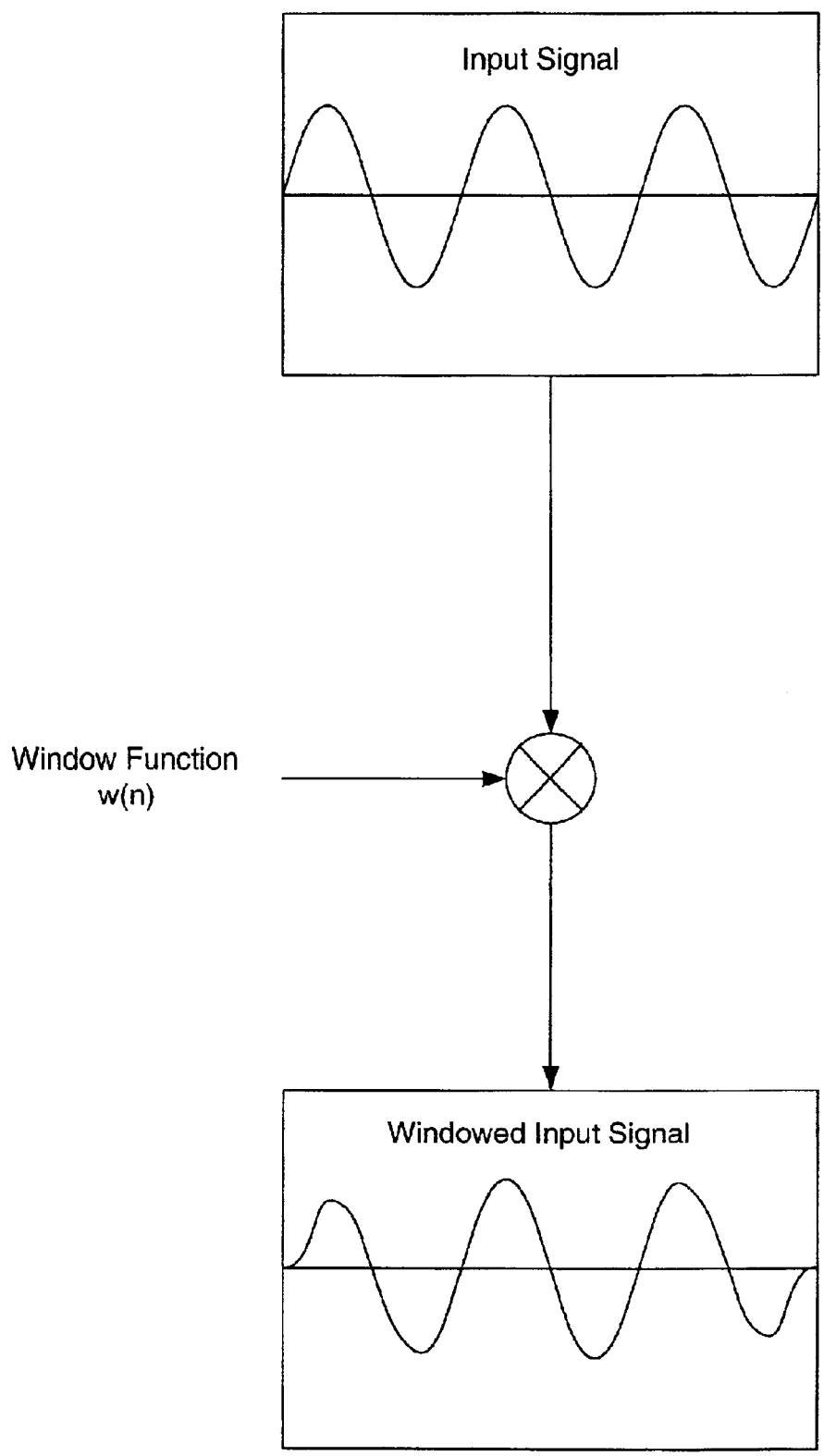
FIG. 4 illustrates a windowing operation being performed on an input signal to generated a windowed input signal.

In step 210, the CPU 140 may receive samples x(n) of the input signal provided by signal reception device SRD, and may multiply the input samples by a known window function w(n) to generate a windowed input signal y(n)=w(n)*x(n) as suggested by FIG. 4. It is noted that the input signal samples may be received from a storage device (e.g. disk, CD-ROM) having been previously recorded/captured from signal reception device SRD. Alternatively, the input signal samples may be simulated samples generated by a simulator (e.g. a CPU executing simulation code). The present invention contemplates a wide variety of possible sources for the input signal samples x(n).

The input signal is assumed to comprise a single sinusoidal tone in the presence of noise. Thus, the input signal may be modeled by the expression.

$$x(n) = A * \cos(\omega_0 n + \theta)$$
$$= (A/2)\exp(j\theta)\exp(\omega_0 n) + (A/2)\exp(-j\theta)\exp(-\omega_0 n),$$

where θ is the phase of the sinusoidal tone, A is the amplitude of the sinusoidal tone, $\omega_0 = 2\pi f_0$ is the frequency of the sinusoidal tone, and n is a discrete time index.

The window function w(n) may have any of a variety of forms. For example, the window function may be a rectangular window, a triangular window, a raised cosine window, a Hanning window, etc.

In step 220, CPU 140 may perform a discrete Fourier transform (DFT) on the windowed input signal y(n) to generate a transform array Y(k), where k is a frequency bin index which may range from 0 to N−1, or any interval of length N, where N is a positive integer. The transform array Y(k) may be modeled by the transform of the sinusoidal tone, i.e.

$$Y(k)=(A/2)\exp(j\theta)W(f-f_0)+(A/2)\exp(-j\theta)W(f+f_0),$$

where W(f) represents the Fourier transform of the window w(n). It is noted that the relationship between frequency f and frequency bin number k is given by $$f=f_s*(k/N),$$

where $f_S$ is the sample rate. The magnitude of the window transform W(f) typically has even symmetry and attains a maximum at f=0. Thus, the function $W(f-f_0)$ attains a maximum magnitude at frequency $f=f_0$, and the function $W(f+f_0)$ attains a maximum magnitude at frequency $f=-f_0$. The first term in the expression above, i.e.

$$P(f)=(A/2)\exp(j\theta)W(f-f_0)$$

is referred to herein as the "positive-frequency image" since its center frequency occurs at the positive frequency $f_0$. The second term in the expression above, i.e.

$$N(f)=(A/2)\exp(-j\theta)W(f+f_0)$$

is referred to herein as the "negative-frequency image" since its center frequency occurs at the negative frequency $-f_0$. Thus, the transform array Y(k) includes a positive-frequency image and negative-frequency image which combine additively (in the sense of complex addition). The input signal may also include noise and/or other spurious tones. However, these are assumed to be insignificant for the embodiments described in connection with FIGS. 3A&B.

If tone frequency $f_0$ stays away from zero or $f_S/2$, and/or, the sample size N is sufficiently large, the overlap between the positive and negative frequency images may be small, and thus, their individual identities may be apparent in the transform array Y(k). The magnitude function |Y(k)| will thus exhibit two peaks which correspond to the positive and negative frequency images. The frequency locations of one of these peaks (i.e. the peak that occurs in the range of positive frequencies) may be used as an estimate for the tone frequency $f_0$.

Conversely, if the tone frequency is close to zero or $f_S/2$, and/or, the sample size N is sufficiently small, the positive-frequency image and negative frequency image may overlap significantly. Thus, their individual identities may not be apparent in the transform array Y(k). In other words, transform array Y(k) restricted to positive frequencies may be a poor approximation to the positive frequency image. Thus, the frequency location at which the magnitude function |Y(k)| attains a maximum, when considered over positive frequencies, is only a crude initial approximation to the tone frequency $f_0$.

Figure 5:
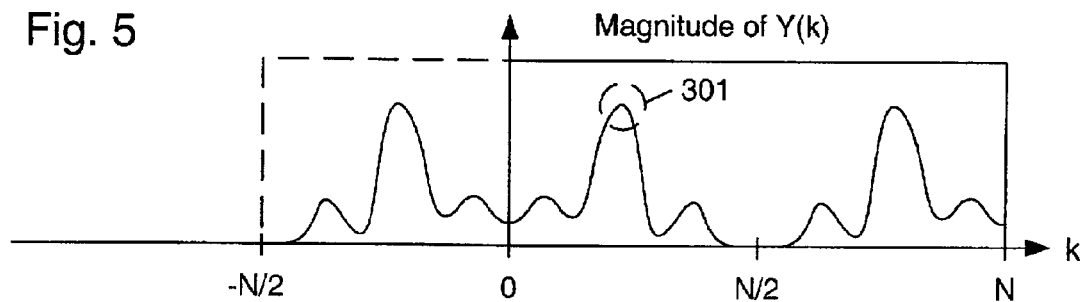
FIG. 5 illustrates the magnitude of transform array Y(k) for a typical windowed input signal comprising a single sinusoidal tone.

FIG. 5 is a plot of the magnitude of transform Y(k) corresponding to a typical windowed input signal y(n). Note that the transform Y(k) has a symmetry given by Y(k)=Y(k+N) for any integer k. In particular, Y(−k)=Y(N−k). Thus, frequency bin numbers between N/2 and N may be interpreted as negative frequencies.

In step 230, CPU 140 may scan the DFT magnitude values |Y(k)| over the range of positive frequency bins to determine the bin index k which achieves the maximum magnitude. In other words, CPU 140 may select $k_{max}$ as the integer bin index value k in the range from 0 to N/2 which maximizes the magnitude of Y(k). In addition, CPU 140 may perform a comparison of $|Y(k_{max}-1)|$ and $|Y(k_{max}+1)|$ to determine whether the second largest magnitude occurs at $(k_{max}-1)$ or $(k_{max}+1)$. Let $k_2$ denote the location of this second largest magnitude. Let $\alpha=|Y(k_{max})|$, and let $\beta=|Y(k_2)|$.

Figure 6:
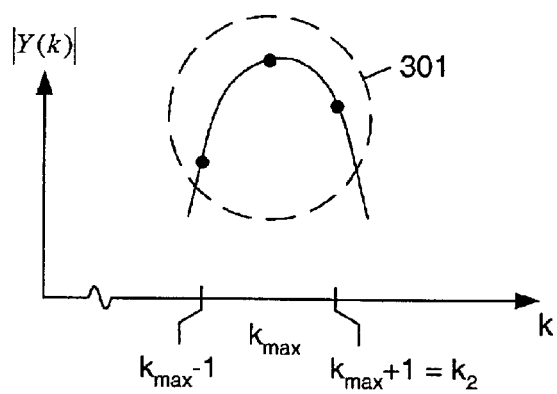
FIG. 6 illustrates a blowup of a generic magnitude peak 301 from the magnitude spectrum of FIG. 5.

It is noted that the maximum of magnitude function |Y(k)| considered as a function of continuous frequency typically does not occur at the integer value $k_{max}$, although it should occur somewhere in the interval between $k_{max}$ and $k_2$. FIG. 6 illustrates a blowup of the positive frequency magnitude peak 301 in the neighborhood of bin index value $k_{max}$.

In step 240, CPU 140 may compute estimates $\hat{f}_0$ and $\hat{A}_0$ for the tone frequency $f_0$ and the tone amplitude A respectively based on the magnitude values |Y(k)| in the neighborhood of the maximizing index $k_{max}$ and an assumed functional form for the window transform W(k).

For example, in the case where the window function w(n) used in step 210 is a rectangular window, the window transform W(k) may be approximated by the expression $W(k)=\sin(\pi k)/(\pi k)$. Thus, the frequency estimate $\hat{f}_0$ and real amplitude estimate $\hat{A}_0$ may be computed according to the relations $$\Delta k = \pm \beta/(\alpha+\beta),$$

$$\hat{A}_0 = \alpha \frac{\pi \Delta k}{\sin(\pi \Delta k)},$$

$$\hat{k}_0 = k_{\max} + \Delta k,$$

$$\hat{f}_0 = f_s \hat{k}_0 / N.$$

The plus solution for $\Delta k$ is chosen if $k_2=k_{max}+1$, and the minus solution for $\Delta k$ is chosen if $k_2=k_{max}-1$.

In the case where the window function w(n) used in step 210 is a Hanning window, the window transform W may be approximated by the expression $W(k)=\sin(\pi k)/[(\pi k)*(1-k^2)]$. Accordingly, the frequency estimate $\hat{f}_0$ and real amplitude estimate $\hat{A}_0$ may be computed according to the relations $$\Delta k = \pm(2\beta-\alpha)/(\alpha+\beta)$$

$$\hat{A}_0 = \alpha \frac{\pi \Delta k}{\sin(\pi \Delta k)}(1-\Delta k^2)$$

$$\hat{k}_0 = k_{\max} + \Delta k$$

$$\hat{f}_0 = f_s \hat{k}_0 / N$$

Note that the plus solution for $\Delta k$ may be chosen if $k_2=k_{max}+1$, and the minus solution for $\Delta k$ may be chosen if $k_2=k_{max}-1$.

A variety of window functions are contemplated. For some window functions w(n), it may be difficult to obtain a simple formula for the window transform W(k). In these cases, values of the transform function W may be numerically approximated and used to compute the frequency and real amplitude estimates.

In step 245, CPU 140 may compute an estimate $\hat{\theta}_0$ for the tone phase using the phase angle of one or more of the complex values Y(k) in a neighborhood of $k_{max}$. In one embodiment, the phase of transform value $Y(k_{max})$ defines the phase estimate $\hat{\theta}_0$, i.e.

$$\hat{\theta}_0 = \text{angle}(Y(k_{max})),$$

where angle(z) denotes the principle angle of the complex number z.

In a second embodiment of step 245, CPU 140 may interpolate the phase of Y(k) between $k_{max}$ and $k_2$ to determine the phase estimate. For example, CPU 140 may perform a linear interpolation based on the phase of $Y(k_{max})$, the phase of $Y(k_2)$, and the value $\Delta k$.

In other embodiments of step 245, CPU 140 may determine the phase estimate $\hat{\theta}_0$ according to either of the expressions:

$$\hat{\theta}_0 = \text{angle}(Y(\text{floor}(\hat{k}_0))) \text{ or}$$

$$\hat{\theta}_0 = \text{angle}(Y(\text{ceil}(\hat{k}_0))),$$

where floor(x) denotes rounding towards minus infinity, and ceil(x) denotes rounding towards plus infinity.

As noted above, the transform array Y(k) is an additive combination of the positive frequency image and the negative frequency image, i.e. Y(k)=P(k)+N(k). Because the positive and negative frequency images may overlap (around DC and/or around Nyquist depending on the value of the tone frequency $f_0$), the peaks appearing in the transform array Y(k) may be interpreted as disturbed versions of the corresponding images. However, given the estimates for tone frequency, amplitude and phase computed in steps 240 and 245, it is possible to compute the DC-aliasing and Nyquist-aliasing contributions of the negative frequency image on the transform array Y(k) in the neighborhood of $k_{max}$. By subtracting these aliasing contributions from the transform array Y(k), a better approximation to the positive frequency image may be obtained.

In step 250, CPU 140 may use the phase estimate $\hat{\theta}_0$, the amplitude estimate $\hat{A}_0$, and the frequency estimate $\hat{k}_0$ to compute the "DC-aliasing" contribution of the negative frequency image at frequency bins k in the neighborhood of $k_{max}$. For example, CPU 140 may compute estimated values $\hat{N}_{dc}(k)$ of the negative frequency image according to the expression $$\hat{N}_{dc}(k) = \frac{\hat{A}_0}{2}\exp(-j\hat{\theta}_0)W(k+\hat{k}_0)$$

for bins k=floor($\hat{k}_0$)+i−1, where i equals 0, 1, 2 and 3, and where floor(x) is the function which rounds x towards minus infinity. (It is noted this neighborhood of $k_{max}$ comprising four bins and starting at floor($k_0$)−1 represents one of many possible choices.) In step 255, CPU 140 may use the phase estimate $\hat{\theta}_0$, the amplitude estimate $\hat{A}_0$, and the frequency estimate $\hat{k}_0$ to compute the "Nyquist-aliasing" contribution of the negative frequency image at the frequency bins k in the neighborhood of $k_{max}$. For example, CPU 140 may compute estimated values $\hat{N}_{Nyq}(k)$ of the negative frequency image according to the expression $$\hat{N}_{Nyq}(k) = \frac{\hat{A}_0}{2}\exp(-j\hat{\theta}_0)W(k-(N-\hat{k}_0))$$

for bins k=floor($\hat{k}_0$)+i−1, where i equals 0, 1, 2 and 3.

In step 260, CPU 140 may compute estimated values $\hat{P}(k)$ for the positive frequency image according to the expression $$\hat{P}(k)=Y(k)-\hat{N}_{dc}(k)-\hat{N}_{Nyq}(k),$$

for the bin index values k in the neighborhood of $k_{max}$.

Figure 7:
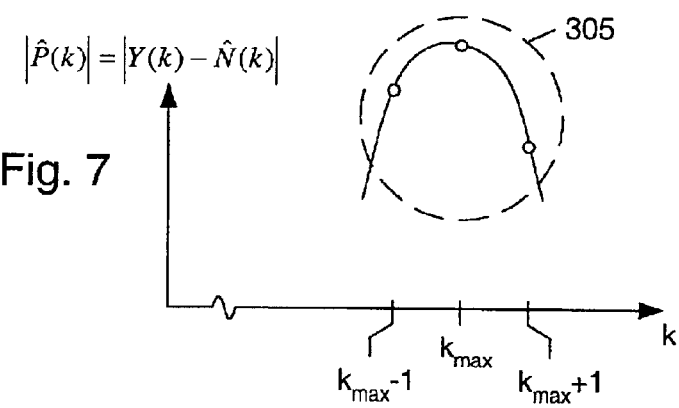
FIG. 7 illustrates the fact that the location and size of a magnitude peak may shift after correction, i.e. after subtracting cross-interaction terms due to aliasing images.

It is noted that the bin location $k_{max}$ of the maximum magnitude for the function $\hat{P}(k)$ may not be the same as for transform array Y(k) as suggested by FIG. 7. Thus, the parameter $k_{max}$ may be updated, i.e. set equal to the integer bin index k at which $|\hat{P}(k)|$ is maximized as indicated in step 265, and $\alpha$ may be set equal to $|\hat{P}(k_{max})|$. Similarly, parameter $k_2$ may be set equal to the integer bin index k where $|\hat{P}(k)|$ attains a second-highest value, and $\beta$ may be set equal to $|\hat{P}(k_2)|$.

In step 270, CPU 140 may compute a second estimate $\hat{k}_0^{(2)}$ for the tone frequency and a second estimate $\hat{A}_0^{(2)}$ for the real tone amplitude based on the complex difference values $\hat{P}(k)$ generated in step 260. CPU 140 may use any of the methods described above in step 240 to determine these second estimates. Because the complex difference values $\hat{P}(k)$ more closely approximate the positive frequency image than the transform values Y(k) in the neighborhood of $k_{max}$, the second estimates may be more accurate than the first estimates. In other words, since the effects of the negative frequency image have been substantially reduced or removed, the new estimates computed in step 270 may be more accurate.

In step 275, CPU 140 may compute an improved estimate $\hat{\theta}_0^{(2)}$ for the tone phase based on the phase angle of one or more of the complex numbers $\hat{P}(k)$ in the neighborhood of the updated $k_{max}$. Any of the methods used to compute the phase estimate of step 245 may be used here to compute the improved phase estimate with the provision that $\hat{P}(k)$ substitutes for Y(k).

In one embodiment, steps 250 through 275 may be iterated as many times as desired, or as many times as necessary to obtain convergence of the frequency, amplitude and/or phase estimates. In each iteration of steps 250 and 255, the negative frequency image may be approximated in terms of the most recent estimates for the tone frequency, amplitude and phase. For example, in a second iteration of step 250, the DC-aliasing contribution of the negative frequency image may be approximated by the expression $$\hat{N}(k) = \frac{\hat{A}_0^{(2)}}{2}\exp(-j\hat{\theta}_0^{(2)})W(k+\hat{k}_0^{(2)}).$$

After step 275, or after multiple iterations of step 250 through 275, CPU 140 may output the final frequency estimate, real amplitude estimate and phase estimate to a user through display device DD or some other output device. Alternatively, these estimates may be stored in a memory for later use by some other signal processing device, or another software application running on CPU 140.

The embodiments described above may generate estimates for the tone frequency, amplitude and/or phase even when the positive and negative images overlap significantly. For example, the tone frequency may be close to DC or one-half the sample rate, and/or, the size N of the DFT may be small.

Hanning Window

In steps 250 and 255 described above, a phase estimate $\hat{\theta}_0$ is used to compute respectively DC-aliasing and Nyquist-aliasing contributions of the negative frequency image to bins in the neighborhood of $k_{max}$. In the Hanning window embodiment, the phase estimate may be handled in different ways depending on whether aliasing compensation is being performed about DC or about Nyquist. Namely, for DC aliasing compensation, CPU 140 computes phase value $\phi_0$ according to the expression $$\hat{\phi}_0=\pi+\text{angle}(Y(k_f)),$$

where $k_f$=floor($\hat{k}_0$) and $\hat{k}_0 = k_{max} + \Delta k$, and the DC aliasing contribution of the negative frequency image according to the expression $$\hat{N}_{dc}(k) = \frac{\hat{A}_0}{2}\exp(-j\hat{\varphi}_0)|W(k+\hat{k}_0)|,$$

for bins k=floor($\hat{k}_0$)+i−1, where i equals 0, 1, 2 and 3, and where |x| denotes the absolute value of x.

Figure 8:
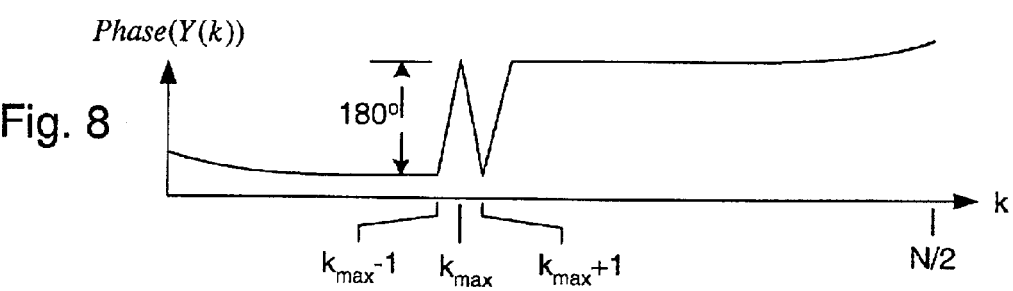
FIG. 8 illustrates the phase of transform array Y in the case where the window function is a Hanning window.

The form of the above expression for the phase estimate arises from the fact that the phase of Y(k) makes a jump of π radians between $k_{max}$ and $k_{max} \pm 1$ when the window function is a Hanning window. FIG. 8 illustrates this 180 degree phase jump in a plot of the phase of transform Y(k) for a typical sinusoidal tone which has been windowed with the Hanning window. Note that the phase at the Nyquist frequency is not shifted with respect to the phase at $k_{max}$. Thus, for Nyquist-aliasing compensation, CPU 140 computes the phase estimate $\hat{\varphi}_0$ according to the expression $$\hat{\varphi}_0 = \text{angle}(Y(k_f)),$$

i.e. without adding 180 degrees, and computes the Nyquist-aliasing contribution of the negative frequency image according to the expression $$\hat{N}_{Nyq}(k) = \frac{\hat{A}_0}{2}\exp(-j\hat{\varphi}_0)|W(k-(N-\hat{k}_0))|$$

for bins k=floor($\hat{k}_0$)+i−1, where i equals 0, 1, 2 and 3. See the source code appendix for a realization of the Hanning window embodiment of the aliasing compensation method written in LabView™.

Detection of Multiple Tones

Figure 9A:
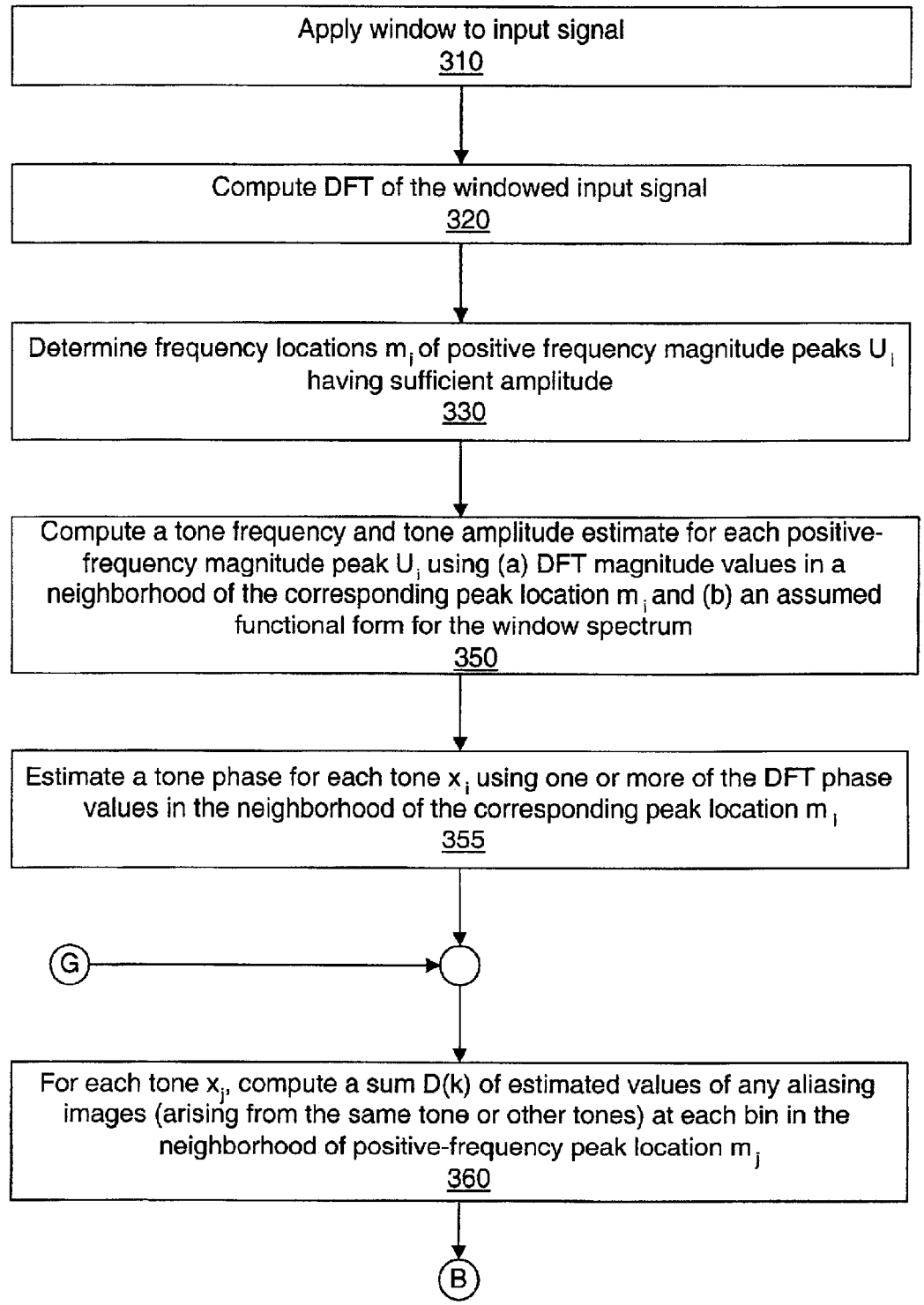
FIGS. 9A–B illustrates one embodiment of a method for detecting signal parameters associated with one or more tones comprised with in an input signal.
Figure 9B:
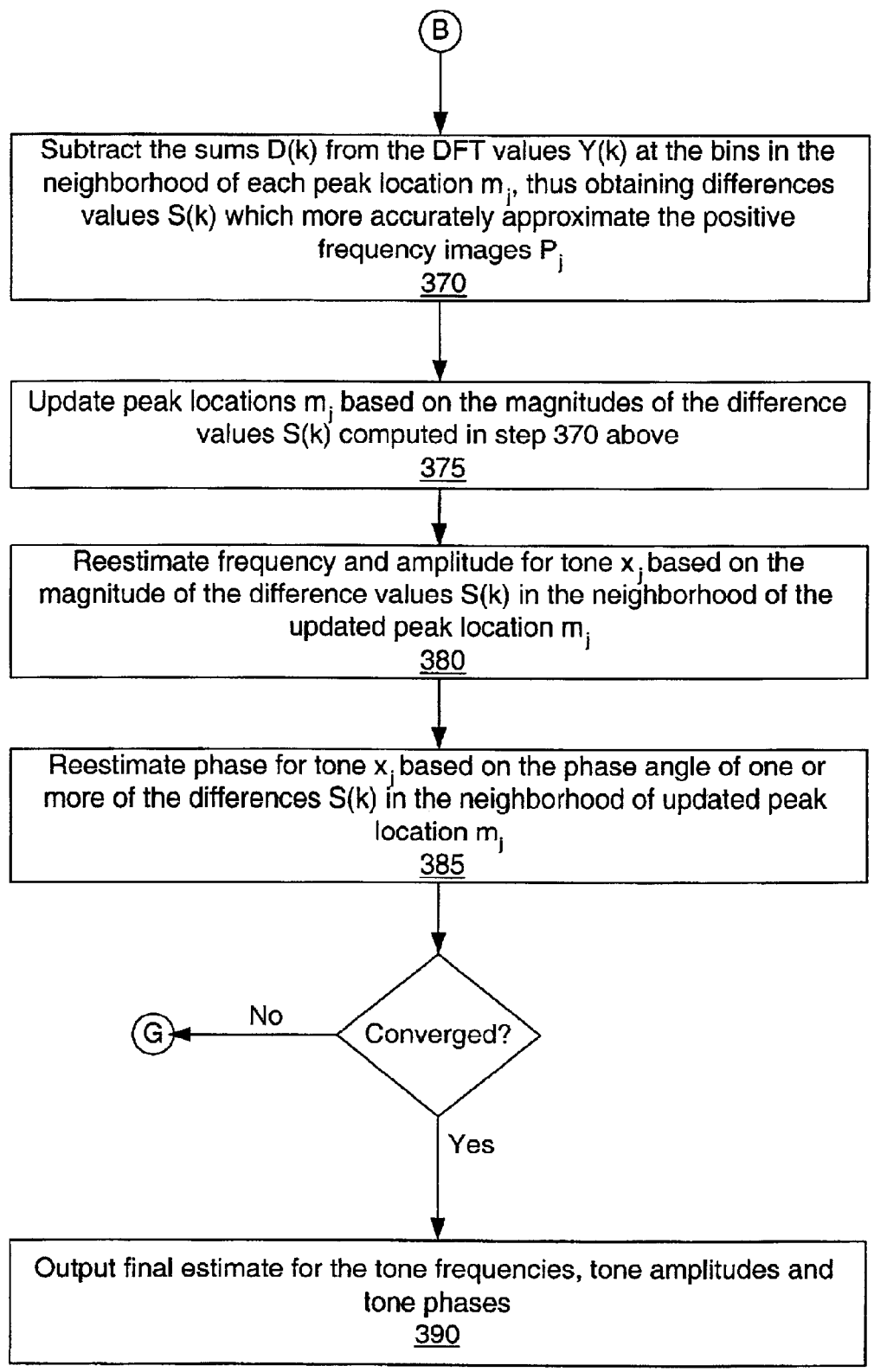

In certain situations, the input signal may include multiple tones having different frequencies. FIGS. 9A&B illustrate one embodiment of a method for detecting the frequencies, amplitudes and/or phases of multiple tones in the input signal. It is noted that the method of FIGS. 9A&B may be implemented as one or more software programs stored in memory 146 and executable by CPU 140.

In step 310, CPU 140 may receive an input signal x(n), and may apply a window w(n) to the input signal x(n) to generate a windowed input signal y(n)=x(n)*w(n). The input signal x(n) may originate from transmission medium 110, and may be presented to tone detection system 120 through signal reception device SRD. However, the present invention contemplates a wide variety of source for the input signal samples x(n). For example, the input signal samples x(n) be may read from a memory medium (e.g. CD-ROM, magnetic disk, etc.) having been previously recorded/captured from transmission medium 110. Also, the input signal sample x(n) may be simulated samples generated by a simulator (i.e. a processor executing in response to simulation code).

In step 320, CPU 140 may compute the DFT of the windowed input signal y(n) to obtain a transform array Y(k).

The input signal may be modeled by the expression $$x(n) = \sum_{i=1}^{L} x_i(n),$$

where $x_i$(n) represents the $i^{th}$ tone of L tones in the input signal. The tone $X_i$ is assumed to have the form $$x_i(n) = A_i * \cos(\omega_i n + \theta_i)$$

$$= (A_i/2)\exp(j\theta_i)\exp(\omega_i n) + (A_i/2)\exp(-j\theta_i)\exp(-\omega_i n),$$

where parameter $\omega_i = 2\pi f_i$ is the frequency of the tone $x_i$, parameter $A_i$ is the real amplitude of the tone $x_1$, and parameter $\theta_i$ is the phase of the tone $x_i$. The input signal may also include noise and/or other spurious tones.

The transform of the $i^{th}$ windowed tone $y_i(n)=x_i(n)*w(n)$ may be modeled as the sum of a positive frequency image $$P_i(f)=(A_1/2)\exp(j\theta_i)W(f-f_i),$$

and a negative frequency image $$N_i(f)=(A_i/2)\exp(-j\theta_i)W(f+f_i),$$

where W is a continuous-frequency expression corresponding to the transform of window w(n). (The positive frequency image has a magnitude envelope which is centered at tone frequency $f_i$. The negative frequency image has an identically-shaped magnitude envelope which is centered at frequency $-f_i$.) Thus, transform array Y(k) may be modeled by a summation of positive and negative frequency images $$Y(k) = \sum_{i=1}^{L} (P_i(f) + N_i(f)),$$

$$f = f_s * (k/N).$$

If the tone frequencies maintain a sufficient mutual separation from one another, are sufficiently far from zero and $f_S/2$, and the sample set size N is sufficiently large, the frequency support regions of the positive and negative frequency images may be essentially non-overlapping or minimally overlapping. Thus, each peak in the magnitude spectrum |Y(k)| may closely approximate one of the positive or negative frequency images, and the frequency location of the magnitude peak may accurately approximate the corresponding tone frequency $f_i$. (Recall, the positive frequency images are centered on the tone frequencies).

Figure 10:
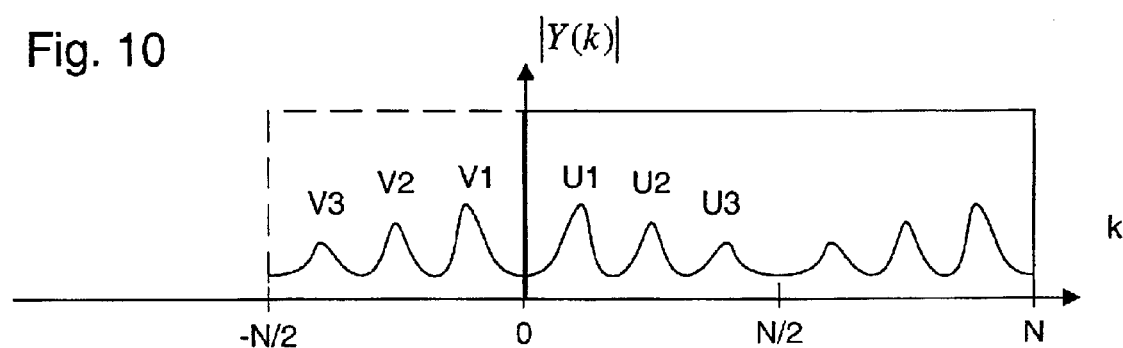
FIG. 10 illustrates the magnitude of a transform array Y corresponding to a typical windowed input signal comprising three sinusoidal tones.

Conversely, if any of the tone frequencies get too close together, too close to zero or $f_S/2$, or N is sufficiently small, the positive and negative frequency images may significantly overlap, and thus, a peak in the magnitude spectrum |Y(k)| may only poorly approximate its corresponding positive (or negative) frequency image, and the center frequency of the magnitude peak may be perturbed away from the corresponding tone frequency $f_1$. FIG. 10 illustrates the magnitude spectrum of a windowed input signal comprising three sinusoidal tones. It is assumed that each positive-frequency magnitude peak $U_1$, corresponds to one of the positive frequency images $P_i$, and each negative-frequency magnitude peak $V_i$ corresponds to one of the negative frequency images $N_i$.

Figure 11:
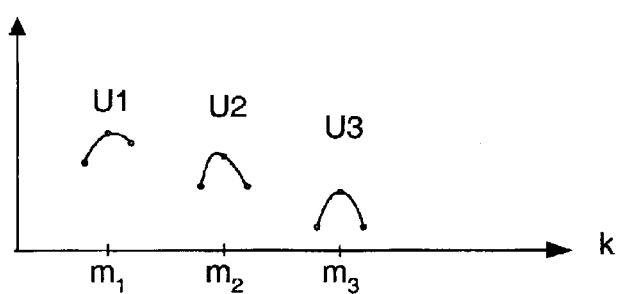
FIG. 11 illustrates three magnitude peaks U1, U2 and U3 extracted isolated from the magnitude spectrum of FIG. 10.

In step 330, CPU 140 may scan the magnitude spectrum |Y(k)| to determine the frequency location of magnitude peaks occurring over the range of positive frequencies as suggested by FIG. 11. In other words, CPU 140 may search for integer bin values $m_i$ which correspond to local maxima of the magnitude spectrum when considered over integer bin values in the range from 0 to N/2. Let $\alpha_i$ equal the maximal magnitude value for each peak, i.e. $\alpha_i=|Y(m_i)|$. The local maxima may be subjected to a minimum magnitude test so that low-level noise peaks and signal side-lobes may be rejected.

In addition, CPU 140 may perform a comparison of the magnitudes $|Y(m_i+1)|$ and $|Y(m_i-1)|$ for each peak location $m_i$ to determine whether the second largest magnitude for the corresponding magnitude peak occurs at $k=m_i+1$ or $k=m_1-1$. Let $p_i$ denote the location of this second largest magnitude. Let $\beta_i$ represent this second largest magnitude value, i.e. $\beta_i = |Y(p_i)|$.

In one embodiment, CPU 140 may identify positive-frequency magnitude peaks which satisfy a magnitude threshold relative to the largest magnitude peak. For example, CPU 140 may select positive frequency magnitude peaks that are more than X decibels below the largest positive-frequency magnitude peak, where X is a user selectable value. FIG. 10 illustrates the magnitude peaks associated with three positive frequency images P1, P2 and P3 and the corresponding negative frequency images N1, N2 and N3.

In step 350, CPU 140 may compute for each tone $x_i$, $i=1, 2, 3, \ldots, L$, an estimate $\hat{f}_i$ for the tone frequency $f_i$ and an estimate $\hat{A}_i$ for the tone amplitude. These estimates may be computed based on the transform magnitude values $|Y(k)|$ in a neighborhood of corresponding positive-frequency peak location $m_i$, and an assumed functional form for the continuous-frequency spectrum W.

In one embodiment, the window function $w(n)$ is a rectangular window. Thus, the continuous-frequency spectrum W may be assumed to have the form $W(k)=\sin(\pi k)/(\pi k)$. In this case, the frequency estimate $\hat{f}_i$ and amplitude estimate $\hat{A}_i$ for tone $x_i$ may be computed according to the relations $$\Delta k_i = \pm \beta_i / (\alpha_i + \beta_i),$$

$$\hat{A}_i = \alpha_i \frac{\pi \Delta k_i}{\sin(\pi \Delta k_i)},$$

$$\hat{k}_i = m_i + \Delta k_i,$$

$$\hat{f}_i = f_s \hat{k}_i / N.$$

The plus solution for $\Delta k_i$ may be chosen if $p_i=m_i+1$, and the minus solution for $\Delta k_i$ may be chosen if $p_i=m_i-1$.

In a second embodiment, the window function $w(n)$ is a Hanning window. Thus, the continuous-frequency spectrum W may be assumed to have the form $W(k)=\sin(\pi k)/[(\pi k)*(1-k^2)]$. In this case, the frequency estimate $\hat{f}_i$ and amplitude estimate $\hat{A}_i$ may be computed according to the relations $$\Delta k_i = \pm (2\beta_i - \alpha_i) / (\alpha_i + \beta_i)$$

$$\hat{A}_i = \alpha_i \frac{\pi \Delta k_i}{\sin(\pi \Delta k_i)}(1 - \Delta k_i^2)$$

$$\hat{k}_i = m_i + \Delta k_i$$

$$\hat{f}_i = f_s \hat{k}_i / N$$

The plus solution for $\Delta k_i$ may be chosen if $p_i=m_i+1$, and the minus solution for $\Delta k_i$ may be chosen if $p_i=m_i-1$.

A variety of window functions are contemplated. For some window functions $w(n)$, it may be difficult to specify a simple formula for the spectrum W. In these cases, the values of $W(k)$ may be numerically approximated and used to compute the frequency and amplitude estimates.

In step 355, CPU 140 may compute, for each tone $x_i$, an estimate $\hat{\theta}_i$ of the tone phase $\theta_1$ using the phase of one or more the transform array values $Y(k)$ in the neighborhood of positive-frequency peak location $m_i$. Any of the methods discussed above in the single tone embodiments may be used for the phase estimation of step 355.

Given the estimates for tone frequency $\hat{k}_i$, tone amplitude $\hat{A}_i$ and tone phase $\hat{\theta}_i$, the corresponding positive frequency image $P_i$ may be approximated by an expression such as $$\hat{P}_i(k) = \frac{\hat{A}_i}{2} \exp(j\hat{\theta}_i) W(k - \hat{k}_i),$$

and the corresponding negative frequency image $N_i$ may be approximated by expressions such as $$\hat{N}_i(k) = \frac{\hat{A}_i}{2} \exp(-j\hat{\theta}_i) W(k + \hat{k}_i) \text{ or}$$

$$\hat{N}_i(k) = \frac{\hat{A}_i}{2} \exp(-j\hat{\theta}_i) W(k - (N - \hat{k}_i)) \text{ or}$$

$$\hat{N}_i(k) = \frac{\hat{A}_i}{2} \exp(-j\hat{\theta}_i) \{W(k + \hat{k}_i) + W(k - (N - \hat{k}_i))\}.$$

Figure 12:
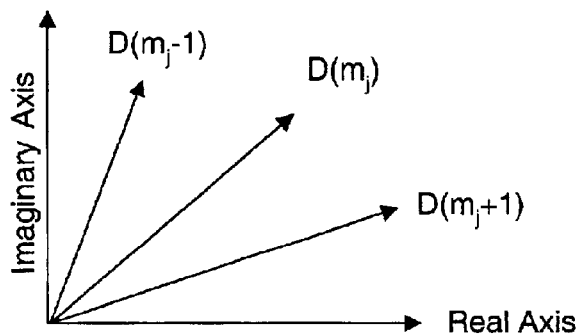
FIG. 12 illustrates the complex correction values D(k) for bin index values k in the neighborhood of a peak frequency location $m_j$.

In step 360, for each value of the index j running from 1 to L (i.e. the number tones), CPU 140 may compute the contributions of the other aliasing images on the transform array values $Y(k)$ in the neighborhood of positive-frequency peak location $m_j$. More specifically, for each value of the index j, CPU 140 may use the image approximations given above to compute a complex sum $$D(k) = \sum_{\substack{i=1 \\ i \neq j}}^{L} \hat{P}_i(k) + \sum_{v=1}^{L} \hat{N}_v(k)$$

for bins k in the neighborhood of positive-frequency peak location $m_j$. In other words, the complex sum $D(k)$ may include the estimated values at bin k of each positive frequency image other than $P_j$, and the estimated values at bin k of all negative frequency images. FIG. 12 illustrates the complex values $D(m_j-1)$, $D(m_j)$ and $D(m_j+1)$ corresponding to a positive frequency magnitude peak $U_j$.

Figure 13:
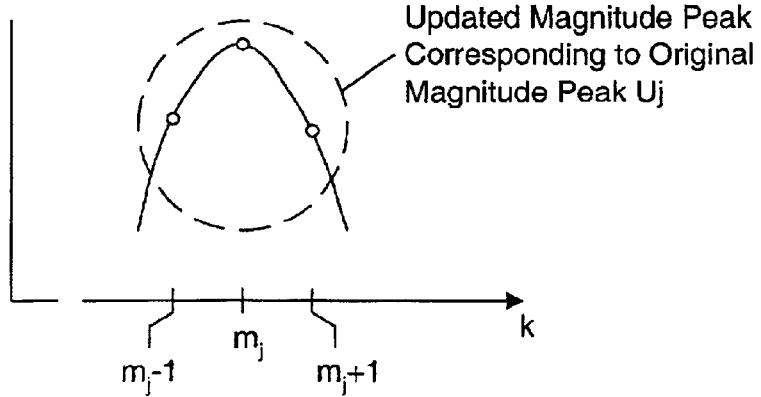
FIG. 13 illustrates an updated magnitude peak corresponding to original magnitude peak $U_j$.

In step 370, for each value of index j running from 1 to L, CPU 140 may subtract the sum $D(k)$ from the corresponding DFT value $Y(k)$ at each bin index value k in the neighborhood of positive-frequency peak location $m_j$. The resulting difference values $S(k)=Y(k)-D(k)$ comprise an improved approximation to the positive frequency image peak $P_j$. FIG. 13 illustrates the magnitude of the difference values in the neighborhood of positive-frequency peak location $m_j$. The subtraction in step 370 may operate to reduce or remove the effects of the other positive and/or negative frequency images on the positive frequency image of the tone of interest.

In step 375, CPU 140 may update the integer peak locations $m_j$ based on the magnitude of the difference values $S(k)$. Because of the subtraction operation of step 370, the magnitude peaks in the difference function $S(k)$ may be shifted in frequency with respect to the corresponding peaks $U_j$ in transform $Y(k)$. For each j in the range 1 to L, CPU 140 may examine the magnitude values $|S(k)|$ in the neighborhood of peak location $m_j$ (i.e. the original peak location $m_j$ computed above in step 330) to determine the integer bin index value of the new maximum magnitude. This bin index value becomes the updated value of peak location $m_j$. The parameter $\alpha_j$ may be updated as the new maximal magnitude, i.e. the magnitude of $S(k)$ at new peak location $m_j$. Similarly, CPU 140 may update the second-to-max peak locations $p_j$ and their corresponding magnitudes $\beta_i$.

In step 380, for each value of the index j running from 1 to L, CPU 140 may compute a second estimate $\hat{f}_j^{(2)}$ for the tone frequency $f_j$ and a second estimate $\hat{A}_j^{(2)}$ for the tone amplitude $A_j$ based on the magnitudes of the complex difference values $S(k)=Y(k)-D(k)$ in the neighborhood of updated peak location $m_j$. CPU 140 may use the same (or similar) methods as those described above in step 350 to determine the second estimates. Because the complex difference $S(k)$ values more closely approximate the positive frequency image peak $P_j$, these second estimates may be more accurate than the first estimates. In other words, since the effects of the other negative and/or positive frequency images have been substantially reduced or removed, the new estimates computed in step 380 may be more accurate.

In step 385, for each value of index j running from 1 to L, CPU 140 may compute a second phase estimate $\hat{\theta}_j^{(2)}$ for tone phase $\eta_j$ based on the phase angle of one or more of the differences $S(k)$ in the neighborhood of updated peak location $m_j$. Any of the methods discussed above in the single tone embodiments may be used for the phase estimation here.

In one embodiment, steps 360 through 385 may be iterated as many times as desired, or as many times as necessary to obtain convergence of the frequency, amplitude and/or phase estimates. In each iteration of step 360, the positive and negative frequency images that contribute to the sums $D(k)$ may approximated in terms of the most recent estimates for the tone frequencies, amplitudes, and phases.

After step 385, or after multiple iterations of step 360 through 385, CPU 140 may output final estimates for the real amplitude, phase and frequency of each tone $T_j$ as indicated in step 390. These final estimates for the multiple tones may be presented to the user on display device DD or through some other output device(s). Alternatively, these estimates for the various tones may be stored in a memory for later use by some other signal processing device, or another software application running on CPU 140.

The embodiments described above may generate estimates for the tone frequencies, amplitudes and/or phases even when the positive and negative frequency images of the tones overlap significantly. For example, the tone frequencies may be close to DC, close to one-half the sample rate, and/or close to each other. Overlap may also be due to spectral leakage when the size N of the DFT is small.

Applications

Embodiments of the present invention may be used in various applications. In general, embodiments of the present invention may be used in any system where it is desired to detect sinusoidal tones present in a signal, e.g., where it is desired to detect the precise frequency, amplitude and/or phase of the tones present in the signal. For example, an embodiment of the present invention may be used in a DTMF (Dual Tone Multi-Frequency) system for detecting tones present in a signal, such as a signal generated by a keypad of a telephone. Embodiments of the present invention are also contemplated for use in applications involving sonar, radar (e.g. Doppler radar), frequency-shift keying applications, mechanical systems analysis, etc. For example, the reflections generated by multiple moving objects in response to a radar pulse have distinct frequencies dependent on their radial velocities with respect to the radar station. Thus, the frequencies of the reflections are usable for tracking the multiple moving objects. In another example, a mechanical system excited with a physical stimulus (e.g. an impulse) may manifest vibrations at one or more frequencies. The frequency, amplitude and/or phase of these vibrations may provide information to a system analyst about the nature of flaws in the mechanical system. Embodiments of the present invention may be used in a wide variety of applications, i.e. in any application where it is desirable to identify one or more tones present in an input signal. The above-mentioned applications are merely representative examples.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for determining signal parameters for one or more tones in an input signal, the method comprising:

(a) receiving samples of the input signal, wherein the input signal includes the one or more tones;

(b) operating on the samples to generate a transform array, wherein the transform array includes a positive frequency image and a negative frequency image for each of the one or more tones;

(c) identifying frequency locations of one or more first magnitude peaks in the transform array;

(d) computing a frequency estimate, amplitude estimate and phase estimate for each of the one or more tones based on complex values of the transform array in a neighborhood of a corresponding one of the frequency locations;

(e) correcting the complex values of the transform array in the frequency neighborhood of each frequency location based on the frequency estimates, amplitude estimates and phase estimates for the one or more tones;

(f) computing an improved frequency estimate, improved amplitude estimate and improved phase estimate for each of the one or more tones based on the corrected complex values in the neighborhood of the corresponding frequency location;

(g) storing the improved frequency estimates, improved amplitude estimates and improved phase estimates for the one or more tones.

2. The method of claim 1, wherein (e) comprises:

(e1) estimating, for a first tone of said one or more tones, the complex contributions of positive and negative frequency images of tones other than said first tone based on the corresponding frequency estimates, amplitude estimates and phase estimates;

(e2) performing a plurality of summations resulting in a plurality of summation values, wherein each summation value includes one of the complex contributions for each of said positive and negative frequency images of tones other than said first tone;

(e3) subtracting the summation values from the corresponding complex values of the transform array in the frequency neighborhood of the frequency location corresponding to the first tone.

3. The method of claim 2, wherein (e) further comprises:

estimating, for the first tone, the complex contribution of the negative frequency image of the first tone based on the frequency estimate, amplitude estimate and phase estimate of the first tone;

wherein each summation further includes one of the complex contributions of the negative frequency image of the first tone.

4. The method of claim 2, wherein (e) further comprises performing (e1), (e2) and (e3) repeatedly as the first tone runs through the one or more tones.

5. The method of claim 1,
wherein one or more of the positive frequency images and negative frequency images of the one or more tones at least partially overlap.

6. The method of claim 1, wherein (e) operates to compensate the effects of the negative frequency images of the one or more tones on the complex values of the transform array in the frequency neighborhood of each frequency location.

7. The method of claim 1, wherein, for a first tone of said one or more tones, (e) operates to compensate the effects of the positive frequency images of tones other than said first tone on the complex values of the transform array in the frequency neighborhood of the frequency location corresponding to the first tone.

8. The method of claim 1, wherein said operating on the samples comprises:
applying a window function to the samples to generate a windowed input signal; and
computing a discrete Fourier transform of the windowed input signal to determine the transform array.

9. The method of claim 1, wherein (d) comprises computing the frequency estimate and amplitude estimate for each of the one or more tones based on the magnitudes of the complex values of the transform array in the neighborhood of the corresponding frequency location.

10. The method of claim 1, wherein (d) further comprises computing the phase estimate for each of the one or more tones based on the phase angle of one or more of the complex values of the transform array in the neighborhood of the corresponding frequency location.

11. The method of claim 1, wherein (f) comprises computing the improved frequency estimate and the improved amplitude estimate for each of the one or more tones based on the magnitudes of the corrected complex values in the neighborhood of the corresponding frequency location.

12. The method of claim 1, wherein (f) further comprises computing the improved phase estimate for each of the one or more tones based on the phase angle of one or more of the corrected complex values in the neighborhood of the corresponding frequency location.

13. The method of claim 1, further comprising:
repeating (e) and (f) one or more times before performing (g);
wherein the improved frequency estimates, improved amplitude estimates and improved phase estimates from a current iteration of (f) are used as the frequency estimates, amplitude estimates and phase estimates in a next iteration of (e).

14. The method of claim 1, wherein, for a first tone of said one or more tones, (e) comprises:
(e1) computing a first shifted window value $W(k,j)$ at a bin index value k for each negative frequency image $N_j$ based on the frequency estimate for the corresponding tone $x_j$;
(e2) multiplying each first shifted window value $W(k,j)$ by the amplitude estimate for corresponding tone $x_j$ to generate a first product $G(k,j)$;
(e3) phase shifting each first product $G(k,j)$ by an angle which depends on the phase estimate of the corresponding tone $x_j$;
(e4) computing a summation value $D(k)$, wherein the summation value $D(k)$ includes the first product $G(k,j)$ for each tone $x_j$ of the one or more tones;
(e5) subtracting the summation value $D(k)$ from the corresponding complex value of the transform array in the frequency neighborhood of the frequency location corresponding to first tone.

15. The method of claim 14, wherein, for the first tone of said one or more tones, (e) further comprises:
computing a second shifted window value $T(k,j)$ at the bin index value k, for each positive frequency image $P_j$ except the positive frequency image $P_1$ corresponding to the first tone, based on the frequency estimate for the corresponding tone $x_j$;
multiplying each second shifted window value $T(k,j)$ by the amplitude estimate for corresponding tone $x_j$ to generate a second product $G(k,j)$;
phase shifting each second product $G(k,j)$ by an angle which depends on the phase estimate of the corresponding tone $x_j$;
wherein the summation value $D(k)$ includes the second product $G(k,j)$ for each tone $x_j$ of the one or more tones other than the first tone.

16. The method of claim 14, further comprising:
repeating (e1) through (e5) for each bin index value k in the frequency neighborhood of the frequency location corresponding to the first tone.

17. The method of claim 1, wherein (c) comprises:
determining magnitude peaks in the magnitude spectrum of the transform array which exceed a magnitude threshold in a range of positive frequencies; and
computing a center frequency for each of the threshold-exceeding magnitude peaks.

18. The method of claim 1, further comprising:
transmitting an indication of the improved frequency estimates, improved amplitude estimates and improved phase estimates for the one or more tones to an output device.

19. A system for determining signal parameters for one or more tones in an input signal, the system comprising:
an input for receiving samples of the input signal, wherein the input signal includes the one or more tones;
an output device;
a memory configured to store program instructions;
a processor configured to read the program instructions from the memory and to execute the program instructions, wherein, in response to execution of the program instructions, the processor is operable to:
(a) receive samples of the input signal, wherein the input signal includes the one or more tones;
(b) operate on the samples to generate a transform array, wherein the transform array includes a positive frequency image and a negative frequency image for each of the one or more tones;
(c) identify frequency locations of one or more first magnitude peaks in the transform array;
(d) compute a frequency estimate, amplitude estimate and phase estimate for each of the one or more tones based on complex values of the transform array in a neighborhood of a corresponding one of the frequency locations;
(e) correct the complex values of the transform array in the frequency neighborhood of each frequency location based on the frequency estimates, amplitude estimates and phase estimates for the one or more tones; and
(f) compute an improved frequency estimate, improved amplitude estimate and improved phase estimate for each of the one or more tones based on the corrected complex values in the neighborhood of the corresponding frequency location; and (g) transmit an indication of the improved frequency estimates, improved amplitude estimates and improved phase estimates for the one or more tones to an output device.

20. The system of claim 19, wherein one or more of the positive frequency images and negative frequency images of the one or more tones at least partially overlap.

21. The system of claim 19, wherein (e) operates to compensate the effects of the negative frequency images of the one or more tones on the complex values of the transform array in the frequency neighborhood of each frequency location.

22. The system of claim 19, wherein, for a first tone of said one or more tones, (e) operates to compensate the effects of the positive frequency images of tones other than said first tone on the complex values of the transform array in the frequency neighborhood of the frequency location corresponding to the first tone.

23. The system of claim 19, wherein, in operating on the samples, the processor is operable to:
   apply a window function to the samples to generate a windowed input signal; and
   compute a discrete Fourier transform of the windowed input signal to determine the transform array.

24. The system of claim 19, wherein, in response to the execution of the program instruction, the processor is operable to compute the frequency estimate and amplitude estimate for each of the one or more tones based on the magnitudes of the complex values of the transform array in the neighborhood of the corresponding frequency location.

25. The system of claim 19, wherein, in response to the execution of the program instructions, the processor is operable to compute the phase estimate for each of the one or more tones based on the phase angle of one or more of the complex values of the transform array in the neighborhood of the corresponding frequency location.

26. The system of claim 19, wherein, in response to the execution of the program instructions, the processor is operable to compute the improved frequency estimate and the improved amplitude estimate for each of the one or more tones based on the magnitudes of the corrected complex values in the neighborhood of the corresponding frequency location.

27. The system of claim 19, wherein in response to the execution of the program instructions, the processor is operable to compute the improved phase estimate for each of the one or more tones based on the phase angle of one or more of the corrected complex values in the neighborhood of the corresponding frequency location.

28. The system of claim 19, wherein the output device is a display device.

29. A method for determining signal parameters for one or more tones in an input signal, the method comprising:
   (a) receiving samples of the input signal, wherein the input signal includes the one or more tones;
   (b) operating on the samples to generate a transform array, wherein the transform array includes a positive frequency image and a negative frequency image for each of the one or more tones;
   (c) identifying frequency locations of one or more first magnitude peaks in the transform array;
   (d) computing one or more of a frequency estimate, amplitude estimate and phase estimate for each of the one or more tones based on complex values of the transform array in a neighborhood of a corresponding one of the frequency locations;
   (e) correcting the complex values of the transform array in the frequency neighborhood of each frequency location based on one or more of the frequency estimates, amplitude estimates and phase estimates for the one or more tones;
   (f) computing one or more of an improved frequency estimate, improved amplitude estimate and improved phase estimate for each of the one or more tones based on the corrected complex values in the neighborhood of the corresponding frequency location;
   (g) storing the one or more of the improved frequency estimates, improved amplitude estimates and improved phase estimates for the one or more tones.

30. The method of claim 29, further comprising:
   transmitting an indication of one or more of the improved frequency estimates, improved amplitude estimates and improved phase estimates for the one or more tones to an output device.

31. A memory medium comprising program instructions for determining signal parameters for one or more tones in an input signal, wherein the program instructions are executable by one or more processors to implement:
   (a) receiving samples of the input signal, wherein the input signal includes the one or more tones;
   (b) operating on the samples to generate a transform array, wherein the transform array includes a positive frequency image and a negative frequency image for each of the one or more tones;
   (c) identifying frequency locations of one or more first magnitude peaks in the transform array;
   (d) computing a frequency estimate, amplitude estimate and phase estimate for each of the one or more tones based on complex values of the transform array in a neighborhood of a corresponding one of the frequency locations;
   (e) correcting the complex values of the transform array in the frequency neighborhood of each frequency location based on the frequency estimates, amplitude estimates and phase estimates for the one or more tones;
   (f) computing an improved frequency estimate, improved amplitude estimate and improved phase estimate for each of the one or more tones based on the corrected complex values in the neighborhood of the corresponding frequency location;
   (g) transmitting an indication of the improved frequency estimates, improved amplitude estimates and improved phase estimates for the one or more tones to an output device.

32. The memory medium of claim 31, wherein (e) operates to compensate the effects of the negative frequency images of the one or more tones on the complex values of the transform array in the frequency neighborhood of each frequency location.

33. The memory medium of claim 31, wherein, for a first tone of said one or more tones, (e) operates to compensate the effects of the positive frequency images of tones other than said first tone on the complex values of the transform array in the frequency neighborhood of the frequency location corresponding to the first tone.

34. The memory medium of claim 31, wherein (d) further comprises computing the phase estimate for each of the one or more tones based on the phase angle of one or more of the complex values of the transform array in the neighborhood of the corresponding frequency location.

35. The memory medium of claim 31, wherein (f) further comprises computing the improved phase estimate for each of the one or more tones based on the phase angle of one or more of the corrected complex values in the neighborhood of the corresponding frequency location.

36. The memory medium of claim 31, further comprising:
repeating (e) and (f) one or more times before performing (g);
wherein the improved frequency estimates, improved amplitude estimates and improved phase estimates from a current iteration of (f) are used as the frequency estimates, amplitude estimates and phase estimates in a next iteration of (e).

37. A method for determining signal parameters for a plurality of tones in an input signal, the method comprising:
(a) receiving samples of the input signal, wherein the input signal includes the plurality of tones;
(b) operating on the samples to generate a transform array comprising complex values;
(c) computing a frequency estimate and an amplitude estimate for each of the plurality of tones based a corresponding first magnitude peak in the magnitude spectrum of the transform array;
(d) computing a phase estimate for each of the plurality of tones based on the phase of at least one of the complex values of the transform array in a frequency neighborhood of the corresponding first magnitude peak;
(e) correcting the complex values of the transform array in the frequency neighborhood of each first magnitude peak based on the corresponding frequency estimates, amplitude estimates and phase estimates of the plurality of tones;
(f) computing an improved frequency estimate and improved amplitude estimate for each of the plurality of tones based on a corresponding second magnitude peak of the corrected complex values;
(g) computing an improved phase estimate for each of the plurality of tones based on the phase of at least one of the corrected complex values in the frequency neighborhood of the corresponding second magnitude peak;
(h) transmitting as output the improved frequency estimate, improved amplitude estimate and improved phase estimate.

38. The method of claim 37 further comprising:
repeating (e) through (g) until a convergence condition based on one or more of improved frequency estimate, improved amplitude estimate, and improved phase estimate.

39. The method of claim 38 wherein the improved frequency estimates, the improved amplitude estimates, and the improved phase estimates determined in a current iteration of (f) and (g) as used as the frequency estimates, amplitude estimates and phase estimates in a next iteration of (e).

40. The method of claim 37,
wherein the transform array comprises an additive combination of a positive frequency image and a negative frequency image corresponding to each of the plurality of tones;
wherein (e) comprises:
estimating, for a first tone, the complex contributions of positive and negative frequency images of tones other than said first tone based on the corresponding frequency estimates, amplitude estimates and phase estimates;
performing a plurality of summations resulting in a plurality of summation values, wherein each summation value includes one of the complex contributions for each of said positive and negative frequency images of tones other than said first tone;
subtracting the summation values from the corresponding complex values of the transform array in the frequency neighborhood of the first magnitude peak corresponding to the first tone.

41. The method of claim 40, wherein (e) further comprises:
estimating, for the first tone, the complex contribution of the negative frequency image of the first tone based on the frequency estimate, amplitude estimate and phase estimate of the first tone;
wherein each summation further includes one of the complex contributions of the negative frequency image of the first tone.

42. The method of claim 37, wherein said operating on the samples comprises:
applying a window function to the samples to generate a windowed input signal; and
computing a discrete Fourier transform of the windowed input signal to determine the transform array.

43. A method for determining signal parameters for a tone comprised within an input signal, the method comprising:
(a) receiving samples of the input signal;
(b) operating on the samples to generate a transform array comprising complex values;
(c) computing a frequency estimate and an amplitude estimate for the tone based a first magnitude peak in the magnitude spectrum of the transform array;
(d) computing a phase estimate for the tone based on the phase of at least one of the complex values of the transform array in a frequency neighborhood of the first magnitude peak;
(e) correcting the complex values of the transform array in the frequency neighborhood of the first magnitude peak based on the frequency estimate, amplitude estimate and phase estimate;
(f) computing an improved frequency estimate and improved amplitude estimate for the tone based on a second magnitude peak of the corrected complex values;
(g) computing an improved phase estimate for the tone based on the phase of at least one of the corrected complex values in the frequency neighborhood of the corresponding second magnitude peak;
(h) transmitting as output the improved frequency estimate, improved amplitude estimate and improved phase estimate.

44. The method of claim 43 further comprising:
repeating (e) through (g) until a convergence condition based on one or more of improved frequency estimate, improved amplitude estimate, and improved phase estimate.

* * * * *